US009811348B2

United States Patent
Saito

(10) Patent No.: US 9,811,348 B2
(45) Date of Patent: Nov. 7, 2017

(54) INFORMATION PROCESSING APPARATUS

(71) Applicant: Panasonic Corporation, Kadoma-shi, Osaka (JP)

(72) Inventor: Shunsuke Saito, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 449 days.

(21) Appl. No.: 14/022,680

(22) Filed: Sep. 10, 2013

(65) Prior Publication Data

US 2014/0082343 A1    Mar. 20, 2014

(30) Foreign Application Priority Data

Sep. 14, 2012   (JP) .................................. 2012-202971
Aug. 6, 2013    (JP) .................................. 2013-163401

(51) Int. Cl.
*G06F 11/34* (2006.01)
*G06F 9/44* (2006.01)
*G06F 21/55* (2013.01)

(52) U.S. Cl.
CPC .......... *G06F 9/4408* (2013.01); *G06F 21/552* (2013.01); *G06F 11/3476* (2013.01); *G06F 2201/86* (2013.01); *Y02B 60/165* (2013.01)

(58) Field of Classification Search
CPC ..... G06F 1/00; G06F 1/04; G06F 1/12; G06F 1/26; G06F 1/32; G06F 11/30; G06F 15/16
See application file for complete search history.

(56) References Cited

U.S. PATENT DOCUMENTS 6,202,158 B1 *  3/2001  Urano ................... G06F 21/316
                                            726/22
7,739,738 B1 *  6/2010  Sobel .................. G06F 12/0891
                                            713/164

(Continued)

FOREIGN PATENT DOCUMENTS

JP   H05298157    11/1993
JP   2008176353    7/2008

(Continued)

OTHER PUBLICATIONS

Office Action issued in Japanese Patent Application No. 2013-163401, dated Nov. 22, 2016, total 4 pages.

(Continued)

*Primary Examiner* — Thomas Lee
*Assistant Examiner* — Mohammad A Rahman
(74) *Attorney, Agent, or Firm* — Hamre, Schumann, Mueller & Larson, P.C.

(57) ABSTRACT

The present disclosure provides an information processing apparatus effective in detecting an unauthorized use or misuse of the information processing apparatus from when the OS is shut down to when the OS is started. An information processing apparatus controlled by an operating system comprises: an operation history generating section which creates an operation history of the information processing apparatus after the operating system is shut down before the operating system is started; and a storage unit which stores information including the created operation history.

8 Claims, 5 Drawing Sheets

(56) References Cited

U.S. PATENT DOCUMENTS

| | | | |
|---|---|---|---|
| 7,797,483 B1* | 9/2010 | Suryanarayanan | G06F 11/1458 711/100 |
| 8,608,057 B1* | 12/2013 | Crews | G06F 21/57 235/379 |
| 2002/0032506 A1* | 3/2002 | Tokitsu | G07B 15/063 701/32.4 |
| 2003/0065935 A1* | 4/2003 | Neufeld | G06F 11/1433 713/190 |
| 2005/0060526 A1* | 3/2005 | Rothman | G06F 9/4401 713/1 |
| 2006/0085630 A1* | 4/2006 | Challener | G06F 21/575 713/2 |
| 2006/0200672 A1* | 9/2006 | Calhoon | G06F 21/16 713/176 |
| 2007/0260918 A1* | 11/2007 | Okada | G06F 1/30 714/14 |
| 2009/0204806 A1* | 8/2009 | Kanemura et al. | 713/155 |
| 2010/0095216 A1* | 4/2010 | Morse | G06Q 20/02 715/738 |
| 2010/0146295 A1* | 6/2010 | Proudler | 713/189 |
| 2011/0238918 A1* | 9/2011 | Royer, Jr. | G06F 12/0802 711/128 |
| 2012/0084549 A1* | 4/2012 | Mackintosh | G06F 21/31 713/2 |
| 2012/0110644 A1* | 5/2012 | Thom | G06F 21/57 726/4 |
| 2012/0284494 A1* | 11/2012 | Funk | G06F 9/4408 713/2 |
| 2013/0198507 A1* | 8/2013 | Kasuya | G06F 1/24 713/100 |

FOREIGN PATENT DOCUMENTS

| | | |
|---|---|---|
| JP | 2010-257340 | 11/2010 |
| JP | 2012108724 | 6/2012 |

OTHER PUBLICATIONS

Hideyuki, Akita, "Linux PD, the second, Hardware or OS" Jan. 1, 2016, vol. 15, No. 1, p. 114-120, total 7 pages.

* cited by examiner

| POSITION/PART, STEP | STATE, VALUE | OCCURRENCE TIME |
|---|---|---|
| 0A010001 | 000001F4 | ················ |
| 0A0B002F | 00001E30 | ················ |
| ⋮ | ⋮ | ⋮ |

INFORMATION PROCESSING APPARATUS

BACKGROUND

1. Technical Field

The present disclosure relates to an information processing apparatus which outputs an operation history as a log.

2. Related Art

JP 2010-257340 A discloses an information processing apparatus which uses SMART information stored in an HDD (Hard Disk Drive). Based on the SMART information stored in the HDD, the information processing apparatus determines whether an unauthorized use of the HDD has been occurred in a period when the information processing apparatus is switched off.

SUMMARY

The present disclosure provides an information processing apparatus effective in detecting an unauthorized use or misuse of the information processing apparatus from when the operating system (OS) is shut down to when the operating system is started.

The information processing apparatus according to the present disclosure is controlled by an operating system and has a storage unit which stores information including an operation history of the information processing apparatus from when the operating system is shut down to when the operating system is started.

The information processing apparatus according to the present disclosure is effective in detecting an unauthorized use or misuse of the information processing apparatus from when the operating system (OS) is shut down to when the operating system is started.

DETAILED DESCRIPTION OF PREFERRED EMBODIMENT

Embodiments will be described below in detail with reference to the drawings as required. However, unnecessarily detailed description may be omitted. For example, detailed description of already known matters and redundant description of substantially the same configuration may be omitted. All of such omissions are for facilitating understanding by those skilled in the art by preventing the following description from becoming unnecessarily redundant.

The inventor provides the attached drawings and the following description for those skilled in the art to fully understand the present disclosure and does not intend to limit the subject-matter of the claims to the attached drawings and the following description.

Circumstances of Embodiments

During a run time, information processing apparatuses such as personal computers can output operation history information in real time. The output operation history information is recorded in memory storage. The operation history information is used for various purposes. For example, the operation history information may be used for detecting a third party's unauthorized use of the information processing apparatus. Also, the operation history information may be used for determining the cause of a malfunction of the information processing apparatus.

The above described conventional operation history information is generated by an operating system (OS) installed on the information processing apparatus. In other words, the conventional operation history information is not generated while the operating system is not running. That is, in such a case where an unauthorized operation has been performed by a third party on the information processing apparatus from when the operating system was shut down to when the operating system is started next, it would be impossible to detect the unauthorized use. Similarly, in such a case where something has caused a malfunction of the information processing apparatus from when the operating system was shut down to when the operating system is started next, it would be quite difficult to determine the cause of the malfunction.

In view of such circumstances, the inventor has developed an information processing apparatus effective in detecting an unauthorized use or misuse of the information processing apparatus during a period from when the operating system is shut down to when the operating system is started next.

First Embodiment

The first embodiment will be described below with reference to FIGS. 1 to 4.

[1-1. Configuration]

Figure 1:
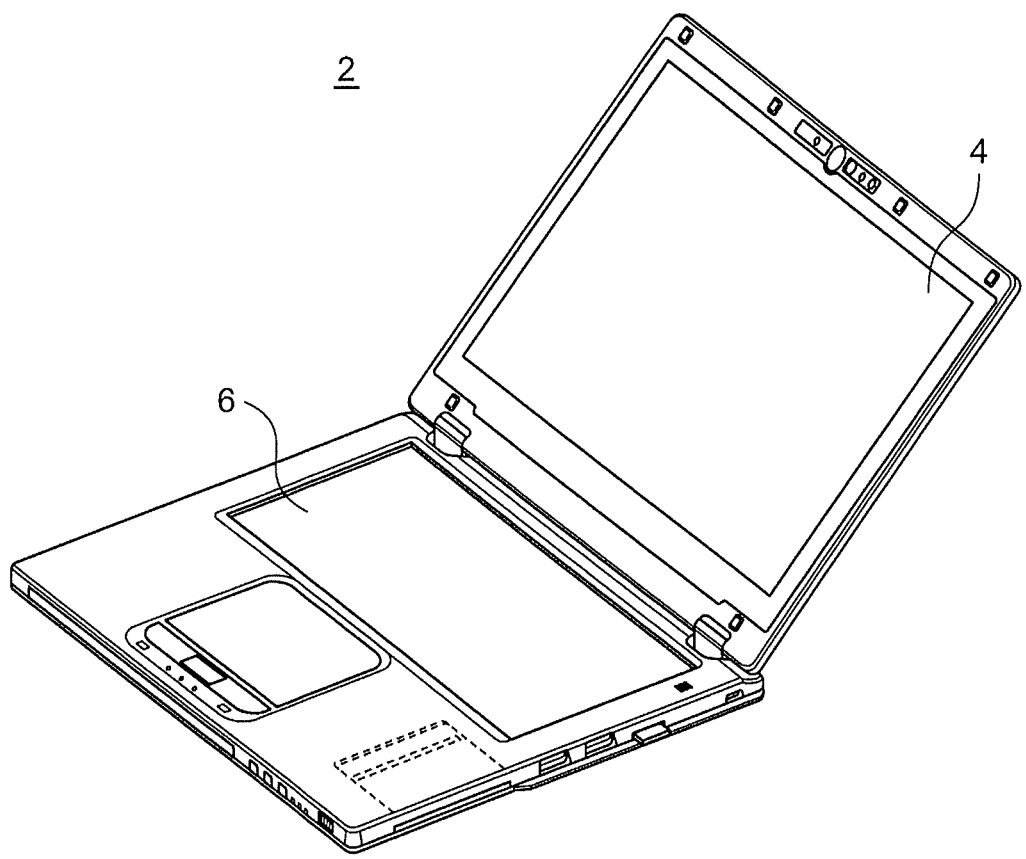
FIG. 1 is a perspective view of an information processing apparatus according to a first embodiment.

FIG. 1 is a perspective view of an information processing apparatus according to the first embodiment. An information processing apparatus 2 according to the first embodiment has an input unit (keyboard) 6 and a display unit (liquid crystal display) 4 as a usual personal computer does.

Figure 2:
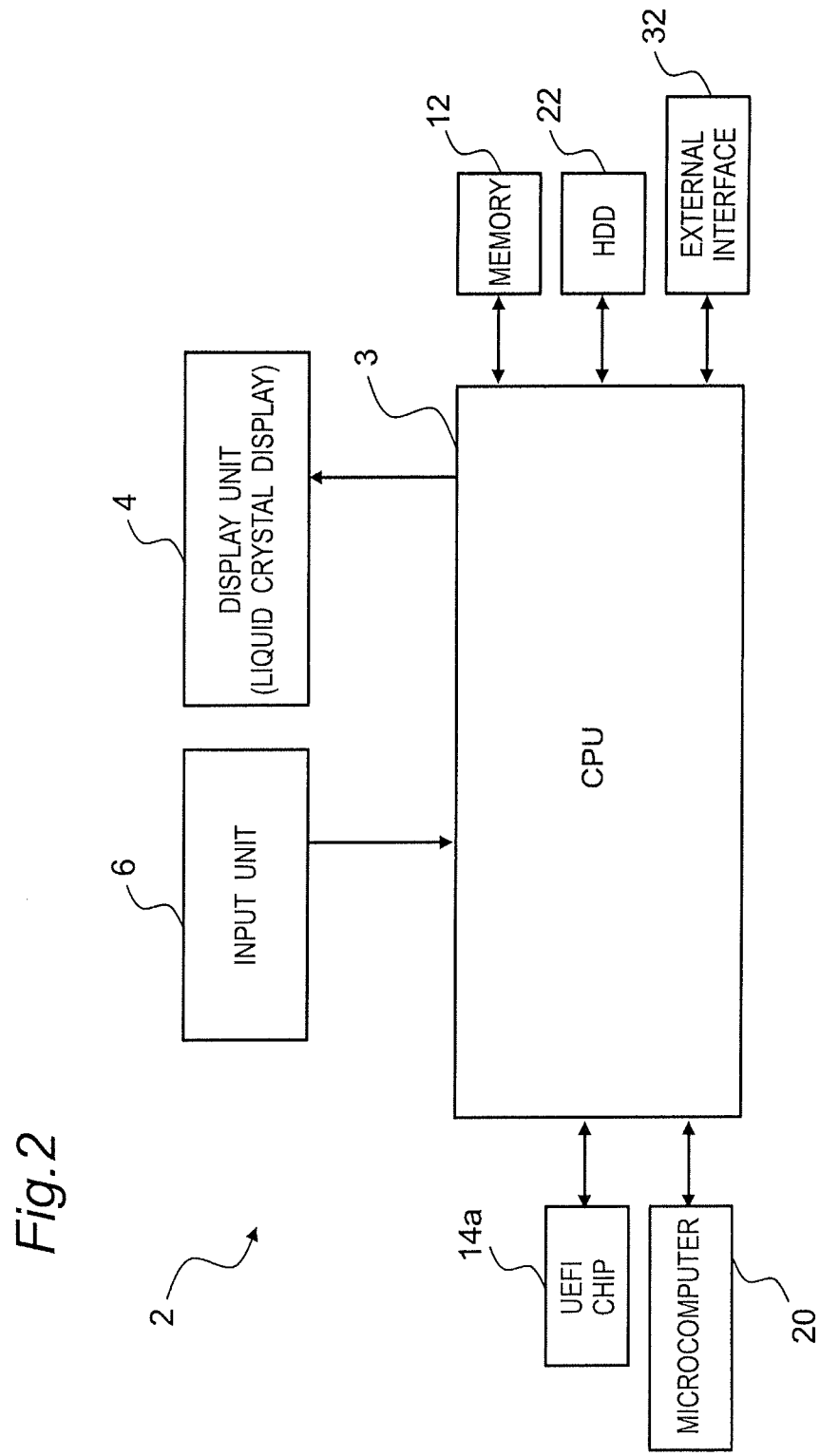
FIG. 2 is a block diagram of a system configuration of the information processing apparatus according to the first embodiment.

FIG. 2 is a block diagram of a system configuration of the information processing apparatus 2 according to the first embodiment. The information processing apparatus 2 has a CPU 3, the display unit (liquid crystal display) 4, the input unit (keyboard) 6, a memory 12, a hard disk 22, an external interface 32, a UEFI Chip 14a, and a microcomputer 20.

The CPU 3 is responsible for an operation processing.

The hard disk 22 stores a program and data used for the operation processing of the CPU 3. Meanwhile, the hard disk 22 may be substituted with a solid state disk (SSD) which uses a flash memory or the like.

The memory 12 temporarily stores a program and data used for the operation processing of the CPU 3.

The external interface 32 is for inputting/outputting a signal from/to an external device such as an external server. The external interface 32 includes, for example, a USB interface and a LAN interface.

The display unit (liquid crystal display) 4 displays an image based on image data output from the CPU 3.

The input unit (keyboard) 6 is an interface for a user to input character information and the like to the information processing apparatus 2. The input unit (keyboard) 6 has a plurality of keys and outputs a signal corresponding to an operated key.

The UEFI Chip 14a is a chip which contains a program for providing functions of the UEFI (described later).

The microcomputer 20 has a function of a power-supply controller and is responsible for control over a battery including detection of a battery temperature, and monitoring and adjustment of the voltage and current of the battery.

In the information processing apparatus 2 according to the second embodiment illustrated in FIG. 2, the CPU 3 reads a program and various types of data stored in the hard disk 22 and performs operation processing based on the program and the data as well as signals from the input unit 6, the external interface 32, and the microcomputer 20.

Figure 3:
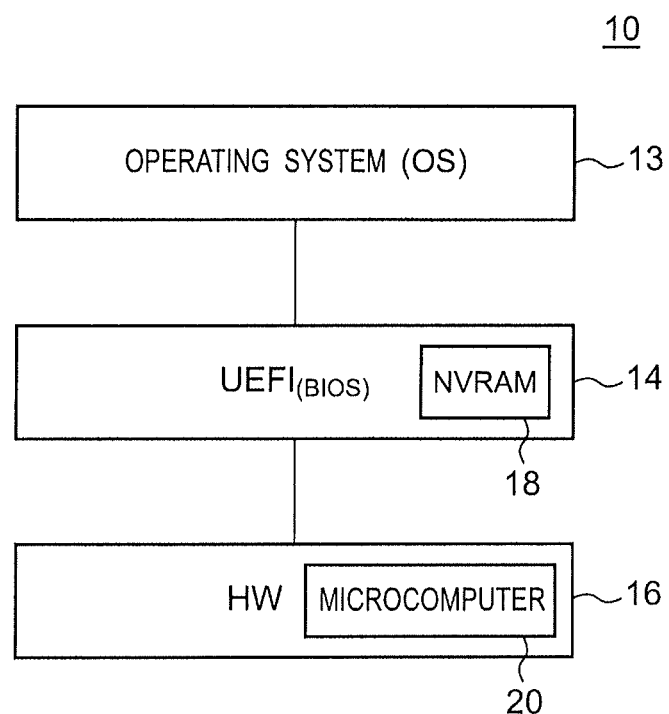
FIG. 3 is a functional block diagram of functions of creating and outputting operation history information (logs) in an idle time of an operating system in the information processing apparatus according to the first embodiment.

FIG. 3 is a functional block diagram of functions of creating and outputting operation history information (logs) in an idle time of the operating system in the information processing apparatus 2 according to the first embodiment. The UEFI (Unified Extensible Firmware Interface) 14 according to the first embodiment illustrated in FIG. 3 is a functional section which functions as an interface between the operating system 12 and hardware 16. The UEFI function is realized by the CPU 3 operating. Specifically, the UEFI function is realized by the CPU 3 reading the program and operating according to the program. The program is for performing input/output of the lowest level from/to the hardware and is installed on a dedicated chip (UEFI Chip) 14a.

The function of UEFI has been conventionally realized by BIOS (Basic Input Output System). Since UEFI is still generally called BIOS and also since UEFI and BIOS have many features in common, both of their names may be written as UEFI (BIOS) in this embodiment. Further, functions such as UEFI, BIOS and EFI (Extensible Firmware Interface) utilized similar to UEFI, which are collectively referred to as firmware, are, also in the present disclosure, defined as firmware.

A UEFI 14 according to the first embodiment illustrated in FIG. 3 manages a nonvolatile RAM section (NVRAM) 18. The UEFI 14 causes the nonvolatile RAM section (NVRAM) 18 to store the operation history information (logs) in an idle time of the operating system (described later). The nonvolatile RAM section (NVRAM) 18 is included in the UEFI Chip 14a.

The microcomputer 20 in the hardware 16 which interfaces with the UEFI 14 illustrated in FIG. 3 has a function as a power-supply controller as described above.

[1-2. Operation]

The UEFI 14 according to the first embodiment illustrated in FIG. 3 creates operation history information (logs) in an idle time of the operating system and causes the nonvolatile RAM section (NVRAM) 18 to store the operation history information (logs). Specifically, the UEFI 14 creates operation history information (logs) and causes the nonvolatile RAM section (NVRAM) 18 to store the operation history information (logs) in predetermined steps of the function of the UEFI 14 from when the UEFI 14 is started to when the operating system is started. The "idle time of the operating system" here means a period from when the operating system is shut down to when the operating system is started next.

Figures 4, 5:
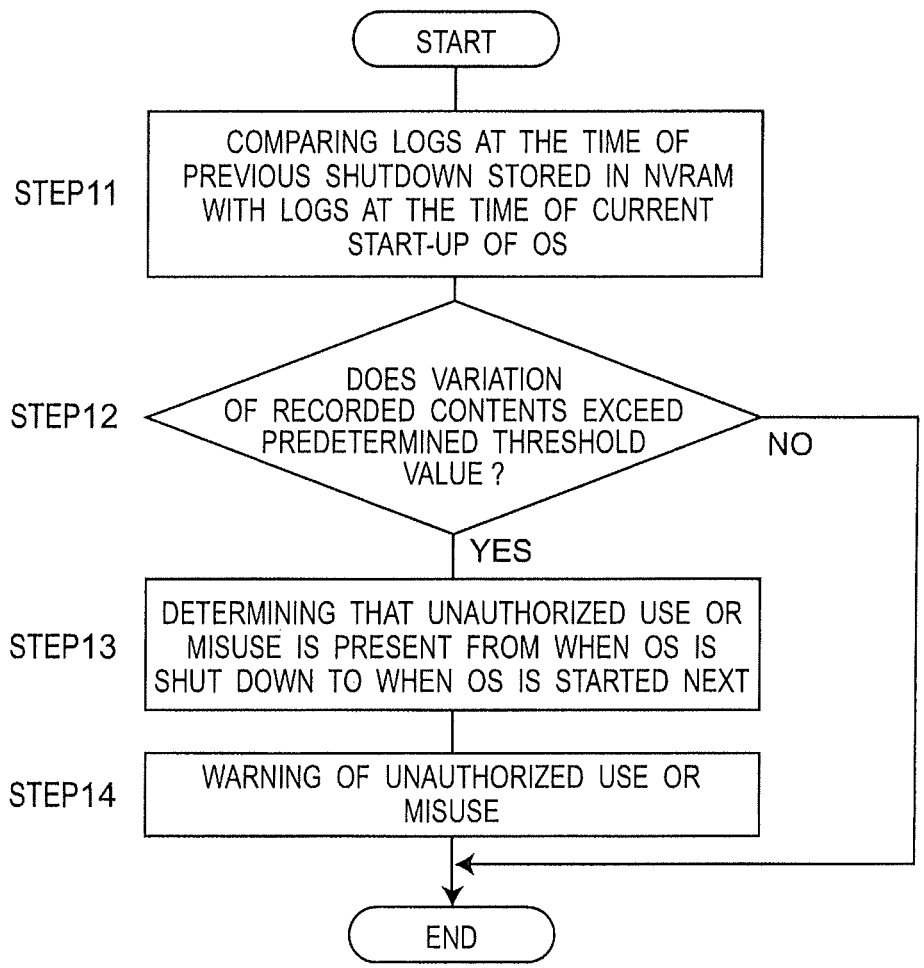
FIG. 4 is a table showing an example of the operation history information (logs) in an idle time of the operating system.
FIG. 5 is a flow diagram of a warning operation performed by an information processing apparatus according to a second embodiment.

FIG. 4 is a table showing an example of the operation history information (logs) in an idle time of the operating system. The operation history information (logs) shown in FIG. 4 includes information about "position/part, step", "state, value", and "occurrence time". The "position/part" here is an item representing a position or a part in the hardware. The "step" is an item representing an operational step of the UEFI 14.

Further, the "state, value" is an item representing a state of respective constituent elements of the information processing apparatus 2. For example, the "state, value" is a data item representing a specific state of the hardware indicated by the "position/part, step" or a data item representing a specific situation of the UEFI 14 in an operational step of the UEFI 14 indicated by the "position/part, step". Meanwhile, the data item "occurrence time" represents the occurrence time in the operation history information (log).

Examples of event indicated in the operation history information (logs) recorded in the nonvolatile RAM (NVRAM) 18 are specifically shown below:

(a) Date and time when UEFI (BIOS) Setup is entered.

(b) Date and time when UEFI (BIOS) password is changed.

(c) Record of UEFI (BIOS) password authentication success/failure.

(d) Date and Time when State of Secure Boot is changed.

(e) Set contents of UEFI (BIOS) Setup.

(a) UEFI (BIOS) Setup is a menu for changing the contents of hardware control managed by UEFI (BIOS). Any wrong or unauthorized operation on this menu will lead a malfunction or an unauthorized use.

(b) UEFI (BIOS) Password Change is a change of password which is required to change the contents of control in UEFI (BIOS) Setup or to enter the Setup menu. Any wrong or unauthorized change of the password causes a malfunction (login is disabled) or an unauthorized use (access is disabled for a regular user).

(c) Information of UEFI (BIOS) Password authentication success/failure is useful for detecting an unauthorized use.

(d) Secure Boot is a function of UEFI for controlling to, when the computer is started, disable any software program other than those previously having digital signatures. Tampering to authentication key of the digital signature due to a malfunction or a fraud introduces a risk of executing an unauthorized software program. Changing the state to disable the function of the Secure Boot also introduces a risk of executing an unauthorized software program.

(e) Set contents of UEFI (BIOS) Setup includes, for example, settings of boot device priority. Any wrong or unauthorized change of the settings disables starting up of the OS or causes an unauthorized OS to be started.

Incidentally, it is preferable that operation history information (logs) in an idle time of the operating system created by the UEFI 14 according to the first embodiment is created at binary level. The created operation history information (logs) is stored in the nonvolatile RAM section (NVRAM) 18 illustrated in FIG. 3.

[1-2-1. Log Obtaining Time]

The UEFI 14 according to the first embodiment can create and record the operation history information (logs) at various timings. Since the operation history information (logs) is used for detecting an unauthorized use by a third party or for determining a cause of a malfunction, it is preferable that the operation history information (logs) is created at least at any one of the timings of (1) to (4) below:

(1) At the time of switching on the power supply.

The UEFI function has not been started at this moment. However, the microcomputer 20 which is a power-supply controller illustrated in FIG. 3 stores an event of switching on the power supply and the occurrence time of the event in a dedicated temporary storage area. When the UEFI 14 is started, the UEFI 14 reads the information which is temporarily stored in the dedicated temporary storage area of the microcomputer 20, creates operation history information (log) about the event of switching on the power supply of the information processing apparatus and the occurrence time of the event, and causes the nonvolatile RAM section (NVRAM) 18 to store the operation history information (log).

(2) At the time when the UEFI 14 has not been started and an event of hardware operation is recorded in the RAM based on the function of hardware such as a CPU.

The hardware such as an HDD has a function of recording an occurrence of rewriting or reading of data in a dedicated temporary storage area even though neither the operating system nor the UEFI has not been started (for example, the SMART function of an HDD described in JP 2010-257340 A). When the UEFI 14 is started, the UEFI 14 reads the information which is temporarily stored in the dedicated temporary storage area, creates operation history information (log) about such an event as the rewriting or reading of data and the occurrence time of the event, and causes the nonvolatile RAM section (NVRAM) 18 to store the operation history information (log).

(3) At the time of starting the UEFI.

When the UEFI 14 is started, the UEFI 14 creates operation history information (log) about an event of starting the UEFI 14 and the occurrence time of the event and causes the nonvolatile RAM section (NVRAM) 18 to store the operation history information (log).

(4) At the time of starting the operating system.

Once the operating system is started, the UEFI 14 creates operation history information (log) about an event of starting the operating system and the occurrence time of the event and causes the nonvolatile RAM section (NVRAM) 18 to store the operation history information (log).

(5) A specific step in the operation of the operating system.

In the operation of the operating system, the operating system can generate operation history information of hardware and the like and record the operation history information in a predetermined storage area, however, in the first embodiment, the UEFI 14 creates operation history information (log) and causes the nonvolatile RAM section (NVRAM) 18 to store the operation history information (log) even in the operation of the operating system. Specifically, when an application software installed in the hard disk 22 attempts to rewrite the NVRAM 18, the UEFI 14 records the operation history in the NVRAM 18. Part of the operation history information created by the operating system may be recorded in the nonvolatile RAM section (NVRAM) 18 as a substitute for or together with a predetermined storage area.

[1-2-2. Recorded Information]

As described in the above [1-2-1. Log Obtaining Time], occurrences of various events are recorded as the operation history information (logs), but in addition, the UEFI 14 records various items of information shown below as the operation history information (logs) at proper timings. Here, the items of information are coupled with each of combinations of the "part" and the "state, value" in the examples shown in FIG. 4.

(a) battery temperature history.
(b) CPU temperature history.
(c) power consumption.
(d) list of valid devices.

Among these items, the information about the battery temperature and the power consumption is obtained by the microcomputer 20 which is a power-supply controller.

[1-3. Effects and the Like]

As described above, in the present embodiment, the information processing apparatus which is controlled by an operating system has an operation history generating section which creates an operation history of the information processing apparatus after the operating system is shut down before the operating system is started and a storage unit which stores the created operation history.

With the above described configuration, the information processing apparatus can be ensured to leave data effective in detecting an unauthorized use or misuse in the operation from when the operating system (OS) is shut down to when the operating system is started.

Second Embodiment

Now, the second embodiment will be described. The information processing apparatus according to the second embodiment uses the operation history information (logs) created and stored by the information processing apparatus 2 according to the first embodiment to detect an unauthorized use or misuse in the operation from when the operating system is shut down to when the operating system is started and notify (warn) the user of the detection via the display unit 4 or the like. The detection and the notification of an unauthorized use or misuse are realized by an appropriate application software installed in the information processing apparatus in cooperation with the hardware resources provided for the information processing apparatus.

[2-1. Warning Operation of the Information Processing Apparatus]

First, when the information processing apparatus according to the second embodiment determines the presence or absence of an unauthorized use or misuse based on the operation history information (logs) from when the operating system is shut down to when the operating system is started and determines that an unauthorized use or misuse is present, the information processing apparatus warns of the detection. FIG. 5 is a flow diagram of a warning operation performed by the information processing apparatus according to the second embodiment. The flow of FIG. 5 is executed after the operating system is started.

First, the information processing apparatus according to the second embodiment compares the operation history information (logs) at the time of previous shutdown stored in the nonvolatile RAM section (NVRAM) 18 with the operation history information (logs) at the time of current start-up of the operating system, as required (FIG. 5, step 11). On this occasion, the information processing apparatus makes the comparison especially based on variation of the recorded contents.

Here, in the case where the variation of the recorded contents exceeds a predetermined threshold value (FIG. 5, step 12, Yes), the information processing apparatus according to the second embodiment determines that an unauthorized use or misuse is present from when the operating system is shut down to when the operating system is started next (FIG. 5, step 13). For example, in the case where any one of predetermined threshold values is exceeded as (a) to (d) below, the information processing apparatus according to the second embodiment determines that an unauthorized use by a third party is present. Here, in the case where one of the predetermined threshold values below is exceeded it may determine that an unauthorized use by a third party is present, or in the case where some of the predetermined threshold values below are exceeded together it may determine that an unauthorized use by a third party is present.

(a) On/Off switching of the power supply of the information processing apparatus has been repeated a predetermined number of times (for example, twice) or more.

(b) Inputting of a password has been attempted on a PreBoot screen for a predetermined number of times (for example, 10 times) or more.

(c) Changing of the boot device has been repeated a predetermined number of times (for example, 10 times) or more.

(d) Switching to a Setup screen of the UEFI (BIOS) has been attempted for a predetermined number of times (for example, 10 times) or more.

Figure 6:
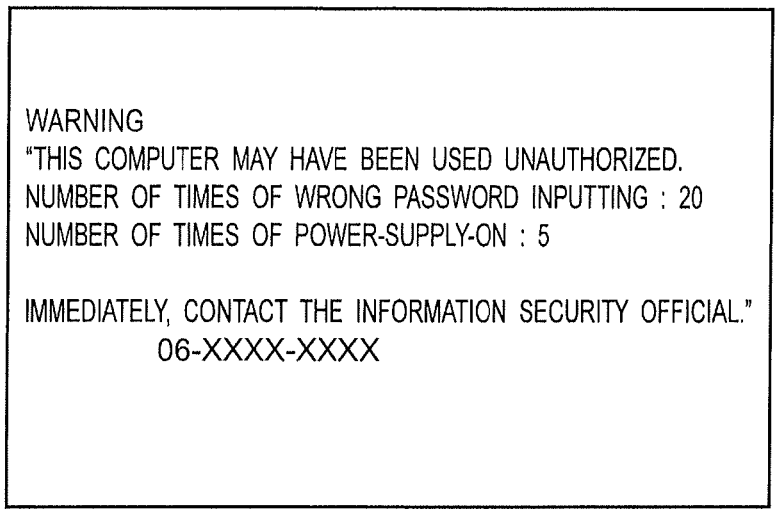
FIG. 6 is a diagram of an example of a warning screen on a display unit displayed by the information processing apparatus according to the second embodiment.

When the information processing apparatus according to the second embodiment determines that an unauthorized use or misuse is present in steps 12 and 13 of FIG. 5, it displays the contents on the display unit 4 to notify (warn) the user (FIG. 5, step 14). FIG. 6 is a diagram of an example of a warning screen on a display unit of the information processing apparatus according to the second embodiment. The warning screen is for notifying the user of the information processing apparatus that unauthorized uses by a third party may have been occurred based on the facts that inputting of a (wrong) password has been attempted for 20 times and that on/off switching of the power supply has been repeated five times.

The information processing apparatus according to the second embodiment may check the respective contents of the operation history information (logs). That will be described with reference to a flow diagram of a warning operation performed by the information processing apparatus shown in FIG. 7.

Figure 7:
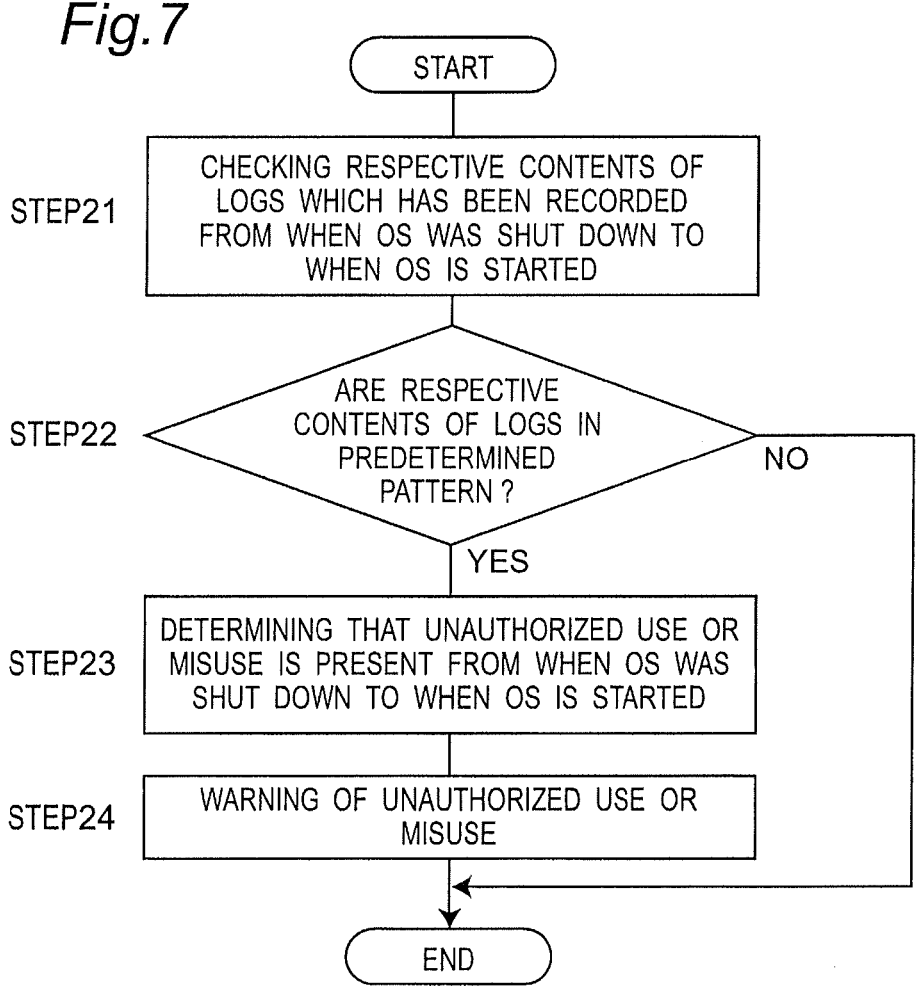
FIG. 7 is a flow diagram of a warning operation performed by the information processing apparatus according to the second embodiment.

First, the information processing apparatus according to the second embodiment checks the respective contents of the operation history information (logs) which has been recorded from when the operating system was shut down to when the operating system is started (FIG. 7, step 21). On this occasion, the information processing apparatus determines whether the respective contents of the operation history information (logs) are in a predetermined pattern, and when they are in the predetermined pattern (FIG. 7, step 22, Yes), it determines that an unauthorized use or misuse is present from when the operating system was shut down to when the operating system is started (FIG. 7, step 23). For example, in the case where any one of such patterns as (e) to (g) below is found, the information processing apparatus according to the second embodiment determines that a misuse is present. Here, in the case where one of the patterns below is found it may determine that a misuse is present, or in the case where some of the patterns are found together it may determine that a misuse is present.

(e) A battery temperature is at a predetermined value or more.

(f) A CPU temperature is at a predetermined value or more.

(g) Power consumption is at a predetermined value or more.

When the information processing apparatus according to the second embodiment determines that misuse or an unauthorized use is present in steps 22 and 23 of FIG. 7, it displays the contents on the display unit 4 to notify (warn) the user (FIG. 7, step 24).

[2-2. Warning Operation Using a Server]

When the information processing apparatus is integrated in a network system which has a server, it is possible to use the server to detect an unauthorized use or misuse of the information processing apparatus from when the operating system is shut down to when the operating system is started and notify (warn) the user via the display unit 4 or the like of the information processing apparatus as below.

First, after the operating system is started, the information processing apparatus sends the operation history information (logs) stored in the nonvolatile RAM section (NVRAM) 18 to the server. When the server receives the operation history information (logs), it determines whether an unauthorized use or misuse has occurred to the information processing apparatus from when the operating system is shut down to when the operating system is started next. The steps of the determination are similar to the steps 11 to 13 of FIG. 5 and the steps 21 to 23 of FIG. 7 described in [2-1. warning Operation of the Information Processing Apparatus].

When the server determines that an unauthorized use or misuse has occurred to the information processing apparatus, it sends data to the effect to the information processing apparatus. When the information processing apparatus receives the data indicating that an unauthorized use or misuse has occurred to the information processing apparatus, it displays the data on the display unit 4 to notify (warn) the user.

Meanwhile, the capacity of the NVRAM 18 in the UEFI Chip 14a of the information processing apparatus is usually as moderate as several megabytes. Therefore, when it is required to record the operation history information (logs) of the information processing apparatus for a long period, it is preferable for the information processing apparatus to send the operation history information (logs) from the NVRAM 18 to the server as required so that the server records the operation history information (logs) in a large-capacity recording medium.

[2-3. Operation Other than Warning Operation]

The information processing apparatus or the server may also perform operation other than the notifying (warning) operation about an unauthorized use or misuse. For example, when the information processing apparatus determines that serious unauthorized processing has been performed on the information processing apparatus (for example, that on/off switching of the power supply of the information processing apparatus has been repeated tens of times), the information processing apparatus may control to suppress the starting operation.

Further, when the server receives the operation history information (logs), it may statistically detect not history information of misuse itself but history information about a risk of causing a failure of the information processing apparatus in a few days in the case where an operation which is included in the operation history information (log) is repeated, and send the result to the information processing apparatus as low-grade warning information.

Further, the server may keep storing the operation history information (logs) about a plurality of information processing apparatuses. The server can associate the contents of the operation history information (logs) with the occurrences of the failures with respect to the respective information processing apparatuses to extract correlation between the contents of the operation history information (logs) and the failures. Further, the server can also extract a predetermined operation history information (logs) pattern which leads failures based on the correlation between the contents of the operation history information (logs) and the failures. The server can use the extracted predetermined operation history information (logs) pattern to detect misuse of the information processing apparatus. Although a case where the server generates a decision criterion based on the log has been described in the above example, the operation of the server is not limited to that. That is, the server may determine whether the operation history information shows a misuse pattern based on a previously defined determination algorithm.

[2-4. Effects and the Like]

As described above, the information processing apparatus according to the second embodiment can effectively notify the user of an unauthorized use or misuse based on the operation history information (logs) after the operating system is shut down before the operating system is started.

Other Embodiments

As described above, the first and second embodiments have been discussed as examples of the technology disclosed in the present application. However, the technology in the present disclosure is not limited to these embodiments and may also be applied to embodiments which are subjected to modifications, substitutions, additions, or omissions as required.

In the first and second embodiments, the UEFI has been described as an example of a history generating section which creates the operation history information (log). However, the history generating section is not limited to that. For example, a SMART function of an HDD may be used as the operation history generating section. In short, the operation history generating section may be implemented in any form as far as it generates operation history information of the information processing apparatus from when the operating system is shut down to when the operating system is started.

The embodiments have been described above as examples of the technology of the present disclosure. For those purposes, the accompanying drawings and the detailed description have been provided. Therefore, the constituent elements shown and described in the accompanying drawings and the detailed description may include not only the constituent element necessary to solve the problem but also the constituent element unnecessary to solve the problem for the purpose of exemplifying the above described technology. Accordingly, it should not be instantly understood that these unnecessary constituent elements are necessary since these unnecessary constituent elements are shown or described in the accompanying drawings and the detailed description.

Also, since the above described embodiments are for exemplifying the technology of the present disclosure, various modifications, substitutions, additions, omissions and the like may be performed on the embodiments without departing from the scope of the claims and the equivalent of the claims.

INDUSTRIAL APPLICABILITY

The present disclosure can be used not only for a desktop personal computer used in a room but also for a laptop personal computer, a notebook computer, and a tablet computer used in various outdoor environments.

What is claimed is:

1. An information processing apparatus controlled by an operating system, comprising:
  a storage unit;
  a CPU; and
  a display unit,
  wherein the storage unit includes a United Extensible Firmware Interface (UEFI) Chip that contains a program for providing functions of a UEFI,
  the storage unit stores firmware to be started before the operating system is started, and
  the CPU stores in the storage unit a history of information input by users during activation of the firmware after the operating system is shut down and before the operating system is restarted, compares the history at the moment of shut down stored in the storage unit with the history at the moment of start of the operating system, and, when variation between the recorded contents of the respective histories exceeds a predetermined threshold value, displays information indicating presence of an unauthorized use on the display unit.

2. The information processing apparatus according to claim 1, wherein the history includes date and time when setup of the firmware is entered.

3. The information processing apparatus according to claim 1, wherein the history includes date and time when password of the firmware is changed.

4. The information processing apparatus according to claim 1, wherein the history includes date and time when security function that the firmware has is disabled.

5. The information processing apparatus according to claim 1, wherein the history includes set contents of boot device priority in the firmware.

6. The information processing apparatus according to claim 1, further comprising a communication section which communicates information including the history to an outside server.

7. The information processing apparatus according to claim 6, wherein when the information including the history agrees with a predetermined pattern, the information processing apparatus receives warning information from said outside server.

8. The information processing apparatus according to claim 1, wherein the information processing apparatus is controlled by a single operating system.

* * * * *